United States Patent [19]

Yoshioka et al.

[11] 4,179,064
[45] Dec. 18, 1979

[54] VENDING APPARATUS

[75] Inventors: Toshihiro Yoshioka, Katano; Tasuku Ishimoto, Toyonaka; Hiroshi Yamane, Hirakata; Takahiro Kita, Osaka, all of Japan; Matsushita Reiki Corp., Ltd., 03, both of Osaka, Japan

[73] Assignee: Matsushita Electric Industrial Co., Ltd.

[21] Appl. No.: 778,110

[22] Filed: Mar. 16, 1977

[30] Foreign Application Priority Data

Mar. 18, 1976 [JP] Japan .................. 51-30122
Mar. 19, 1976 [JP] Japan .................. 51-30194

[51] Int. Cl.$^2$ .................. G07F 7/08; G06K 19/06
[52] U.S. Cl. .................. 235/381; 235/487
[58] Field of Search .................. 194/4 R, 4 C, 4 E, 4 F, 194/4 G; 340/149 R, 149 A, 274 C, 152 R; 235/419, 487, 488, 380, 381

[56] References Cited

U.S. PATENT DOCUMENTS

| 3,639,906 | 2/1972 | Tritsch | 340/149 A |
|---|---|---|---|
| 3,845,470 | 10/1974 | Schuller | 340/149 A |
| 3,872,435 | 3/1975 | Cestaro | 340/149 R X |
| 3,935,933 | 2/1976 | Tanaka et al. | 194/4 R |
| 4,012,583 | 3/1977 | Kramer | 340/149 R X |
| 4,120,452 | 10/1978 | Kimura et al. | 235/487 X |

*Primary Examiner*—Joseph J. Rolla
*Attorney, Agent, or Firm*—Burgess, Ryan and Wayne

[57] ABSTRACT

A vending apparatus has a plurality of cash-less vending machines installed in guest rooms and meeting rooms and at any other suitable places in hotels and supermarkets, and any customers who want to use the vending machines may have their own memory holders from a front or cashier. Upon insertion of the memory holder into the vending machine and depression of a merchandise selection button or the like, a selected merchandise is discharged from the vending machine while sales information such as a code and price of the sold merchandise is stored in memory element in the holder, and when the memory holder is returned and inserted into an accounting machine, the sales information is read out from the memory holder to prepare a bill. The vending machines and the accounting machine are enabled in response to the output from a sensor which detects the insertion of the memory holder.

14 Claims, 20 Drawing Figures

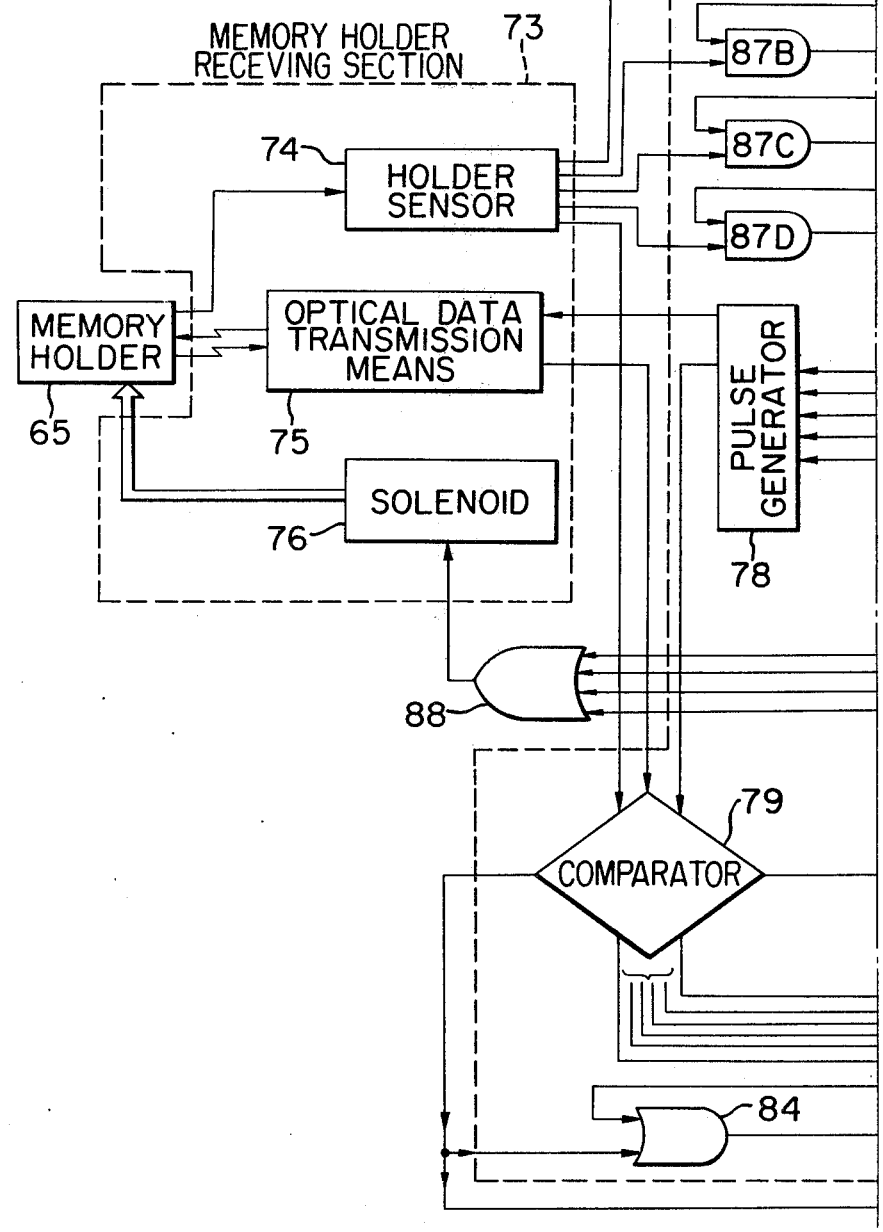

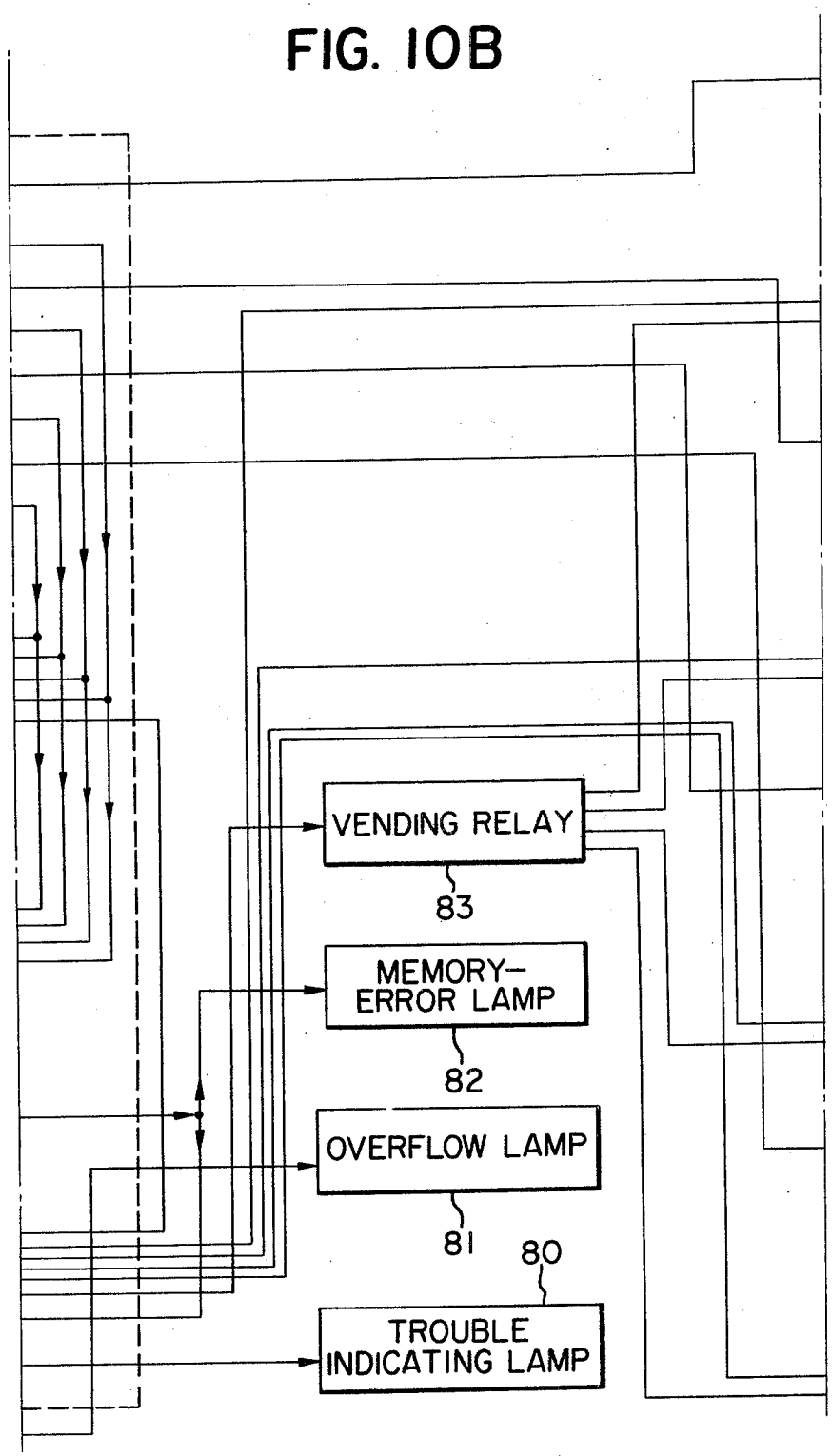

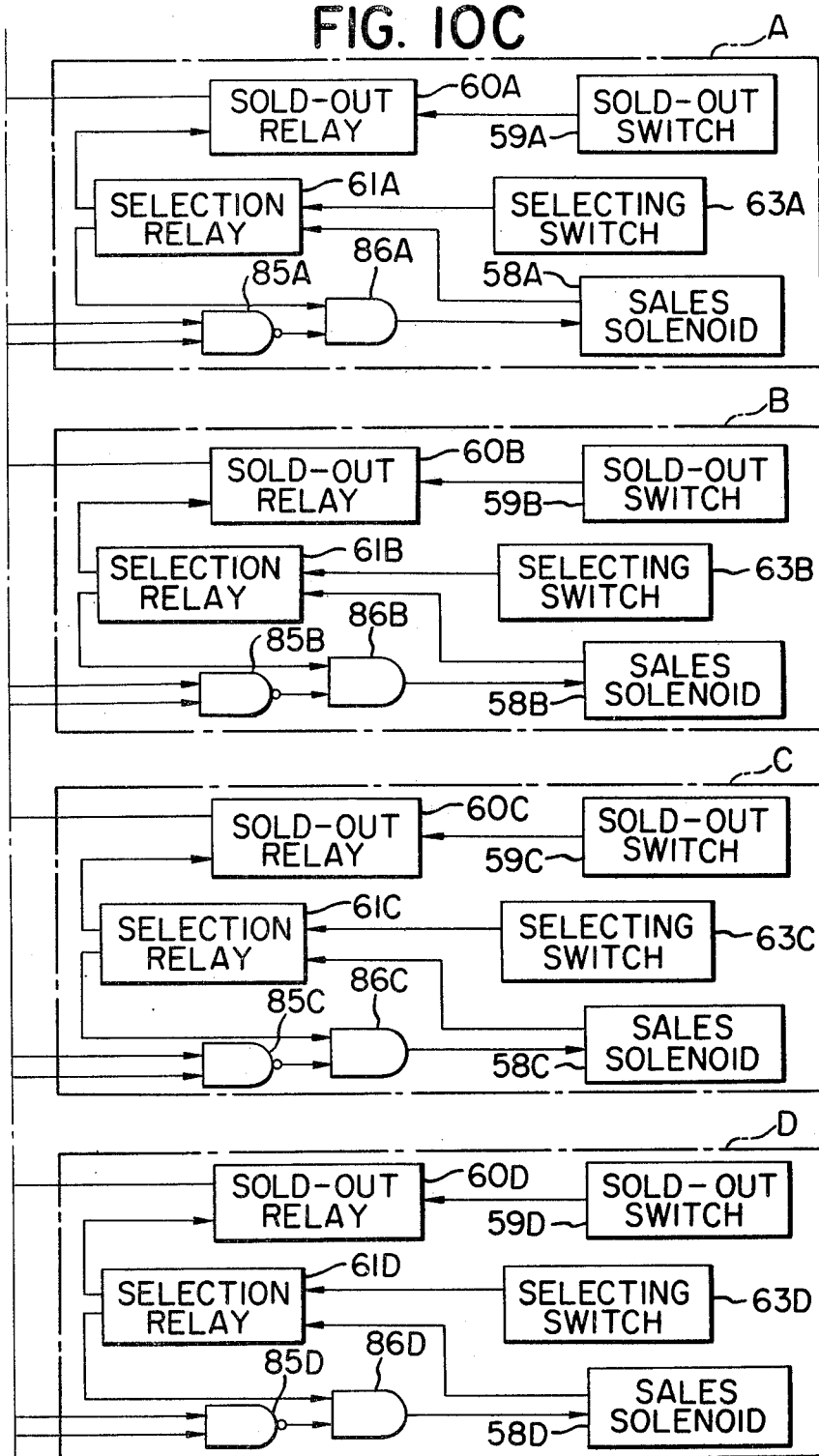

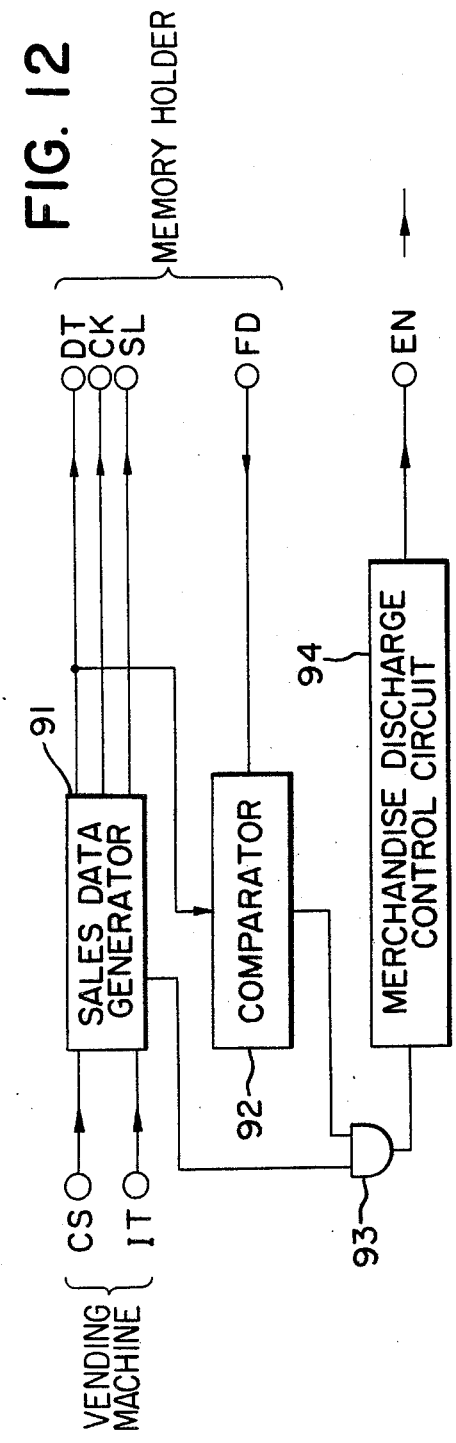
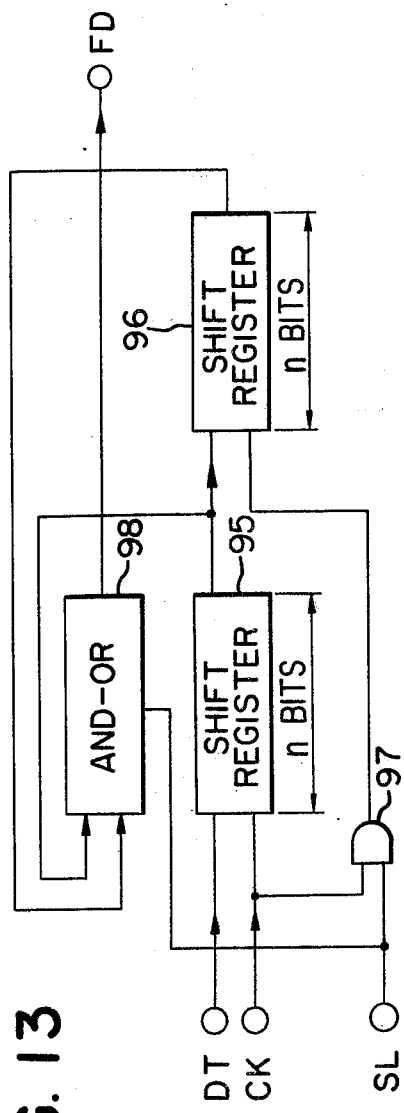

VENDING APPARATUS

BACKGROUND OF THE INVENTION

The present invention relates to a vending apparatus comprising of a plurality of cash-less vending machines installed for instance in guest rooms in a hotel, meeting rooms and supermarkets, an accounting machine such as a cash register and memory holders each for each customer enabling him to buy a desired merchandise from any of the vending machines, the sales information such as codes and prices of merchandises sold being stored in the memory holder and being read out by the accounting machine for preparing a bill, and to portions of said apparatus.

There has been devised and demonstrated a vending system wherein an accounting machine such as a cash register with an electronic computer is interconnected through wires with a plurality of vending machines installed in guest rooms and meeting rooms in a hotel or the like so that the sales data transmission may be made between the accounting machine and the vending machines. However, since the accounting machine and the vending machines are interconnected with wires, the greater the number of the vending machines, the greater the number of wires becomes and consequently the higher the installation cost becomes.

In some supermarkets there are installed vending machines from which a customer may buy a desired merchandise with a card bearing a specific code number. The vending machines are connected to an electronic computer so that the codes and prices of the sold merchandise as well as the code number of the customer who has bought said merchandise may be processed for preparing a bill. However, the computer and the vending machines are interconnected through wires so that the installation cost is high.

Furthermore, in some existing hotels or the like the installation of wiring is impossible between the accounting machine or electronic computer and the vending machines.

SUMMARY OF THE INVENTION

One of the objects of the present invention is therefore to provide a vending apparatus or system consisting of a plurality of vending machines which may be operated by a portable memory holder adapted to store the sales data so that the vending apparatus may be installed at less cost.

Another object of the present invention is to provide a vending apparatus wherein the sales data transmission between the memory holders and an accounting machine or vending machines may be, optically, or accoustically made.

A further object of the present invention is to provide a vending apparatus wherein a memory holder given to a specific customer such as a minor stores a sales-inhibition signal for inhibiting a specific merchandise such as cigarettes or alcoholic drink.

A further object of the present invention is to provide a vending apparatus wherein a merchandise code generated when a customer depresses a merchandise selection button or the like is compared with a merchandise code stored in memory means in the memory holder and when the two codes coincide with each other a selected merchandise may be discharged or sold but when they fail to coincide the sales is inhibited and wherein when the overflow of the memory means occurs, the sales is also prohibited.

A further object of the present invention is to provide a vending apparatus wherein each memory holder has a main memory and an auxiliary or buffer memory which stores temporatily a merchandise code of a selected merchandise item and feeds back the code to the vending machine for comparision with the original code and when the two codes coincide with each other the selected merchandise is permitted to be discharged and the contents in the auxiliary or buffer memory are transferred into the main memory so that the sales data of merchandise actually sold may be correctly stored to avoid a dispute between a customer and a cashier.

A further object of the present invention is to provide a vending apparatus wherein shift registers are used as the memory means of the memory holder and the merchandise codes are represented by binary digits so that the transmission of the sales data to the shift registers may be simplified and wherein the memory holders are not marked with identification codes such as room numbers so that the mass production of memory holders may be possible.

Briefly stated, to the above and other ends the present invention provides an automatic vending apparatus comprising a plurality of vending machines each containing different kinds of merchandise which may be freely selected by a customer; a merchandise code generator disposed within each of the vending machines for generating a merchandise code of a merchandise selected by the customer; connection means disposed within each of the vending machines; a plurality of memory holders each carried by a customer for permitting the selection of merchandise when connected to said connection means; memory means such as a shift register or registers disposed within each of the memory holders for storing therein the merchandise code transmitted from said merchandise code generator; switching means disposed within each memory holder for enabling the storage into said memory means of a merchandise code transmitted from said merchandise code generator when closed; an accounting machine adapted to read the merchandise codes stored in said memory means in the memory holder when connected thereto for preparing a bill, and actuating means disposed adjacent to said connection means of the vending machine and a connection means of said accounting machine for causing said switching means to be closed when the memory holder is connected to said connection means.

BRIEF DESCRIPTION OF THE DRAWINGS

FIGS. 10A-C are block diagrams of the vending machine;

FIG. 12 is a block diagram of a vending machine used in the third embodiment;

FIG. 13 is a block diagram of the memory holder shown in FIG. 11;

DESCRIPTION OF THE PREFERRED EMBODIMENTS

First Embodiment, FIGS. 1 through 6

Figure 1:
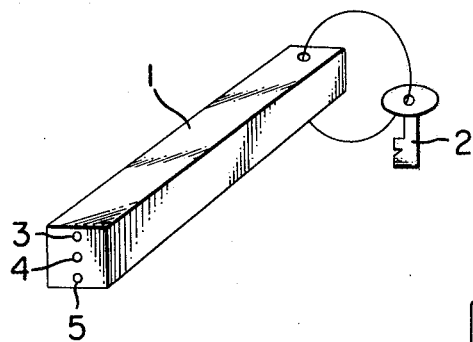
FIG. 1 is a perspective view of a memory holder used in a first embodiment of a vending apparatus in accordance with the present invention.

Referring to FIG. 1, a memory holder 1 is in the form of a bar having a square scross section so that when a vending apparatus is installed in a hotel, it may be used also as a key holder. Therefore a key 2 is attached to one end of the memory holder 1 and phototransistors 3 and 4 and a light emitting diode 5 are attached to the other end.

Figure 3:
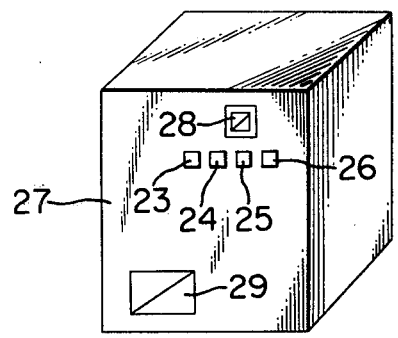
FIG. 3 is a schematic perspective view of a vending machine.
Figure 2:
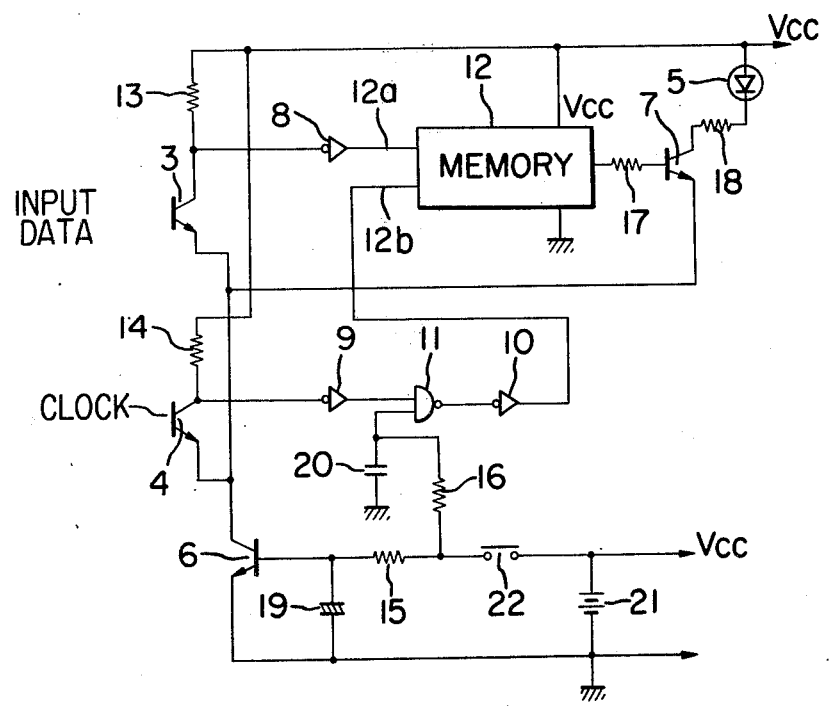
FIG. 2 is a diagram of an electric circuit thereof.

The memory holder 1 has an electronic circuit as shown in FIG. 2 and consisting of, in addition to the phototransistors 3 and 4 and the light emitting diode 5, transistors 6 and 7, inverters 8 through 10 consisting of semiconductor integrated circuits, a NAND gate 11, a memory 12, resistors 13 through 18, capacitors 19 and 20, a power source 21 consisting of dry cells, and a reed switch 22 which may be closed when one of merchandise selection buttons 23 through 26 shown in FIG. 3 is depressed. These parts are capsulated or potted in the memory holder 1 with a plastic or the like.

The memory 12 is constructed with the shift register (MC 1417) made by MOTOROLA INC. in which n bits shown in the binary code are continuously memorized.

Figure 4:
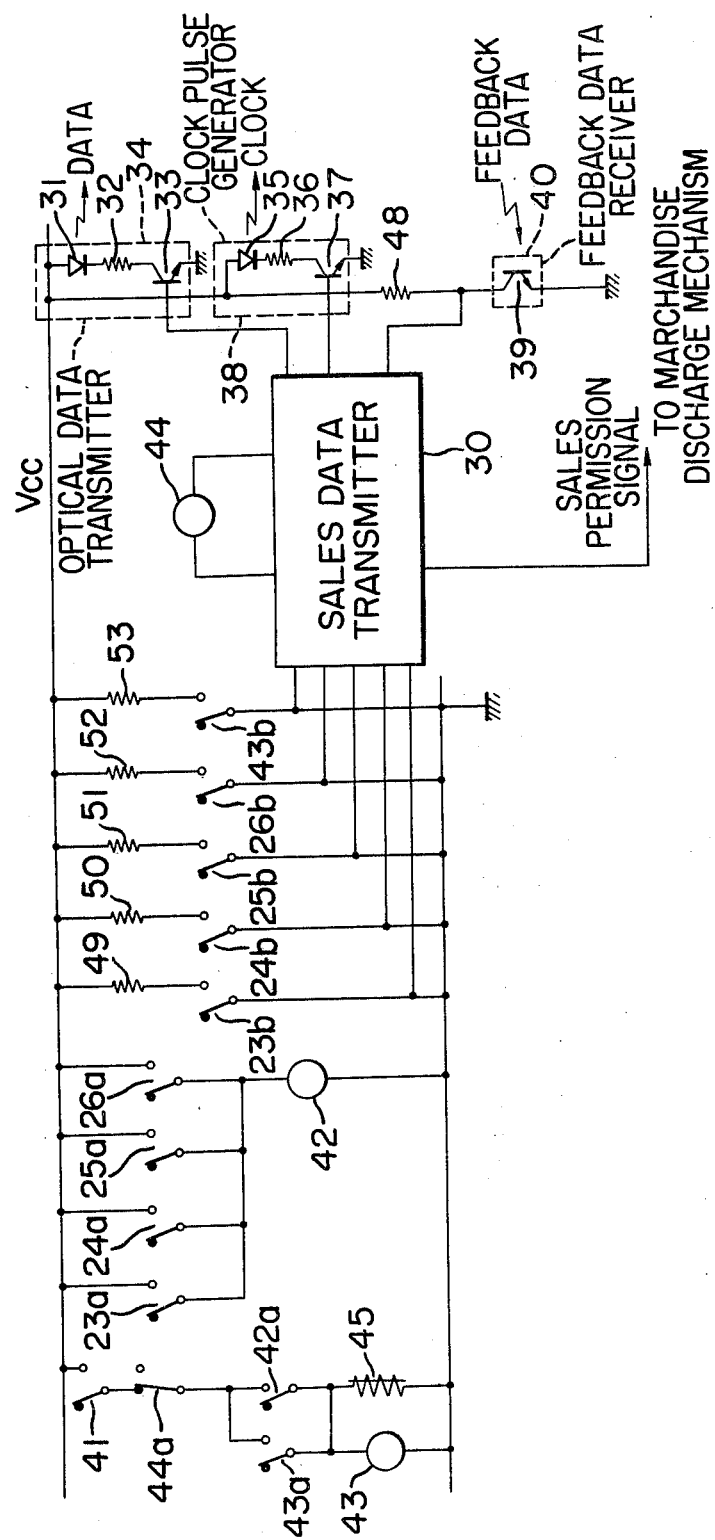
FIG. 4 is a circuit diagram thereof.
Figure 5:
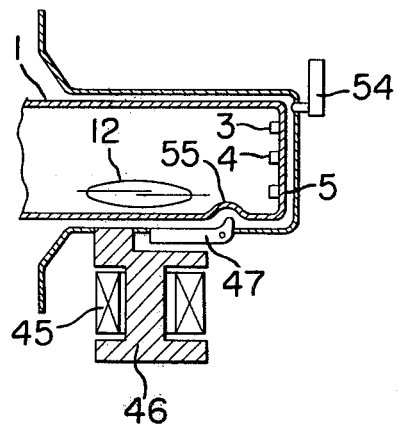
FIG. 5 is a fragmentary sectional view, on enlarged scale, illustrating the memory holder inserted into the vending machine.

FIGS. 3, 4 and 5 are views used for the explanation of the first embodiment, FIG. 3 showing the outer appearance of a vending machine, FIG. 4 being a diagram of an electronic circuit incorporated therein, and FIG. 5 showing the memory holder 1 inserted into a memory holder insertion hole of the vending machine.

When the holder 1 is inserted into an insertion hole or opening 28 of the vending machine 27 and one of the merchandise selection buttons 23 through 26 is depressed, a desired merchandise is discharged from a merchandise discharge opening or chute 29. More particularly, when one of the selection buttons 23 through 26 is depressed, an information or code of a selected merchandise item is transmitted to a sales data transmitter 30 (See FIG. 4). Sales information from the sales data generator 30 is transmitted to the memory holder 1 through an optical data transmitter 34 consisting of a transistor 33, a resistor 32 and a light emitting diode 31 and through clock pulse generator 38 consisting of a transistor 37, a resistor 36 and a light emitting diode 35. A feedback data receiver 40 consisting of a phototransistor 39 receives the sales data which are stored in the memory holder 1 and fed back to the vending machine 27. The fed back sales data are transmitted to the sales data transmitter 30 so that when the sales data transmitted to the memory holder 1 coincide with the sales data fed back from the holder 1, a merchandise item discharge signal is transmitted to a merchandise discharging mechanism (not shown) and a selected merchandise is discharged. The light emitting diodes 31 and 35 and the phototransistor 39 are so positioned that they may be operatively coupled with the corresponding phototransistors 3 and 4 and the light emitting diode 5 of the memory holder 1 when the latter is inserted into the insertion hole 28. In the circuit shown in FIG. 4, reference numeral 41 denotes a microswitch which may be closed when the memory holder 1 is correctly inserted into the opening 28; 42, a relay with contacts 43a and 43b; 44, a reset relay with contacts 43a and 43b; and 45, a solenoid with a core 46 for closing the switch 22 of the holder 1.

Referring to FIG. 5, a lever 47 which is actuated by the solenoid 45 is adapted to engage with a recess 55 of the memory holder 1 to lock the memory holder 1 in a correct operative position. That is, this locking means consisting of the lever 47 and the recess 55 is provided in order prevent the memory holder 1 from being pulled out of the opening 28 while the vending machine 27 is operating or to prevent the displacement of the memory holder 1 even when a customer touches it so that erratic sales data storage and erratic operation of the vending mechanism may be prevented.

Referring back to FIG. 4, the selection buttons 23 through 26 have first contacts 23a through 26a, respectively, and second contacts 23b through 26b, and reference numerals 48 through 53 denote resistors.

Referring back to FIG. 5, reference numeral 54 denotes a microswitch.

Next the mode of operation of the first embodiment will be described. When a customer inserts the memory holder 1 into the opening 28 of the vending machine 27, the holder 1 actuates the microswitch 54 and is locked in operative position by the lever 47. When the customer pushes one of the selection buttons 23 through 26, one of the contacts 23a through 26a is closed to energize the relay 42 to close its contact 42a so that the solenoid 45 is energized. Since the relay 43 is also energized the contact 43a is closed so that a self-holding circuit is established for holding the solenoid 45. Since the switch 22 of the memory holder 1 is positioned in opposed relation with the solenoid 45, the former is closed so that the electronic circuit shown in FIG. 2 of the memory holder 1 is supplied with the power from the power source 21; that is, the electronic circuit is biased and is operative. When the switch 22 is not closed, no bias is applied to the phototransistors 3 and 4 and the light emitting diode 5 so that the power consumption is at a minimum and no data transmission is permitted.

Referring back to FIG. 4, the signal produced by the closure of one of the second contacts 23b through 26b is applied to the sales data generator 30. The contact 43b of the relay 43 is closed when the solenoid 45 is energized and the signal generated by the closure of the contact 43b is also applied to the data generator 30. In response to these two inputs, the sales data generator 30 transmits the sales data consisting of a code of a selected merchandise and clock pulses to the phototransistors 3 and 4 of the memory holder 1 which are a merchandise code input and a clock pulse input, respectively.

Referring to FIG. 2, when the switch 22 is closed, integration circuits one consisting of the resistor 15 and the capacitor 19 and another consisting of the resistor 16 and the capacitor 20 are enabled so that the phototransistors 3 and 4 are powered from the power source 21 and the logic "1" is applied to one input terminal of NAND gate 11. The time constants of the integration circuits are so selected as to satisfy the following condition:

$$R_{15} \times C_{19} < R_{16} \times C_{20}$$

where $R_{15}$ and $R_{16}$ are the values of the resistors 15 and 16, respectively, and $C_{19}$ and $C_{20}$, the values of the capacitors 19 and 20, respectively.

After the transistor 6 has been conducted and the logic "1" is applied to one input (connected to the integration circuit consisting of the resistor 16 and the capacitor 20) of the AND gate 11, the input merchandise code and clock pulses are applied to the phototransistors 3 and 4, respectively, so that the input code is transmitted through the inverter 8 to a first input terminal 12a of the memory 12 whereas the clock pulses are transmitted to a second input 12b thereof through AND gate 11 and the inverter 10. As a result, the merchandise code generated by the code generator 12 in the vending machine 27 is stored in the memory 12 of the memory holder 1. When the code is correctly stored, the sales permission signal is generated and a selected merchandise item is discharged as will be described in detail hereinafter.

The light emitting diode 5 of the memory holder 1 is used for reading out the code or codes stored in the memory 12 for checking whether the code transmitted from the vending machine has been correctly stored or not and for preparing a bill.

Upon completion of one sales transaction, the reset relay 44 is energized to close its contact 44a so that the solenoid 45 is de-energized to open the switch 22. As a result, power source 21 supplies the power only to the memory 12 which may consist of semiconductor elements such as CMOS devices with low energy conumption so that the dry cells making up the power source 21 may be used for a long time.

Still referring to FIG. 2, the electrostatic capacitance between the electrodes of each phototransistor 3 or 4 is as high as tens of picofarods so that when the bias voltages are applied to the phototransistors 3 and 4 after the transistor 6 has become conductive, the transient collector-emitter currents flow, resulting in a collector voltage drop. As a result, they operate as if they had received optical inputs. To solve this problem, the present invention provides an integration circuit consisting of the resistor 16 and the capacitor 20 and NAND gate 11 so that only after the capacitor defined by the electrodes of each phototransistor 3 or 4 has been sufficiently charged, does the integration circuit (16, 20) generate the logical "1" output which is applied to one input terminal of the NAND gate 11. Therefore even when the phototransistors 3 and 4 are turned on and off, erratic code storage into the memory 12 due to the transient phenomena may be prevented.

The merchandise codes stored in the memory 12 of the memory holder 1 may be read out through the light emitting diode 5 by an accounting machine at for instance a front in a hotel by delivering N bits of clock pulses through the phototransistor 4. When the data in the memory 12 are read out, the codes are erased.

Figure 14:
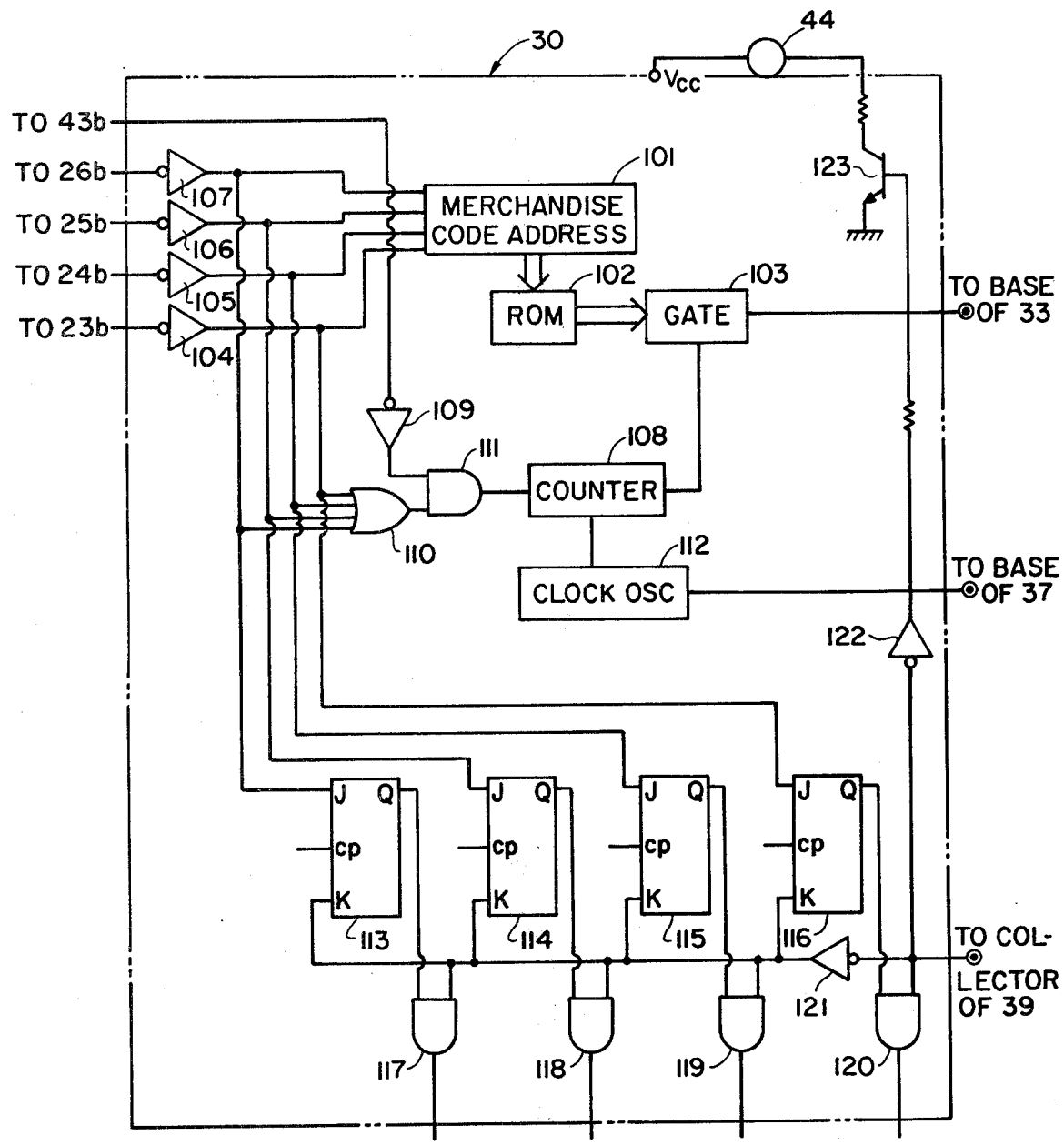
FIG. 14 is a functional block diagram of a sales data transmitter utilized in the system of the present invention.

Moreover, the sales data transmitter 30 is explained in FIG. 14. A merchandise address 101 takes out the outputs of the selection buttons 23–26 by operating these buttons. ROM 102 memorizes the data of sales-merchandise by the n bits of the binary code corresponding to the signals of the merchandise address and transmits the n bits signals, corresponding to the signals of the merchandise address 101 to the gate 103. The reference numerals 104, 105, 106 and 107 show NOT gates for transmitting signals to the merchandise address by operating the selection buttons 23–26. A counter 108 generates and transmits square waves to the gate 103 and a clock oscillator 112 by detecting in an AND gate 111 whether signals due to operating the selection buttons 23–26 and the contact 43b of the relay 43 appear or not. The n bits signals of the gate 103 are generated by the signals of the ROM 102 and the counter 108 and are transmitted to the base of the transistor 33 of the optical data transmitter 34 shown in FIG. 14. The outputs of a clock pulse generator 112 are transmitted to the base of the transistor 37 in the clock pulse generator 38. J-K flip-flops 113, 114, 115 and 116 take out signals when the selection buttons 23–26 are pushed and sale of merchandise is not performed, and these signals are transmitted through AND gates 117, 118, 119 and 120 to the merchandise discharge mechanism as a signal enabling a discharge when the feedback data receiver 39 of the feedback data 40 is conducted. A NOT gate 121 takes out a signal when the feedback data receiver 39 is conducted. A relay 44 is driven through a NOT gate 122 and a transistor 123 when the feedback data receiver 39 is conducted.

Figure 16:
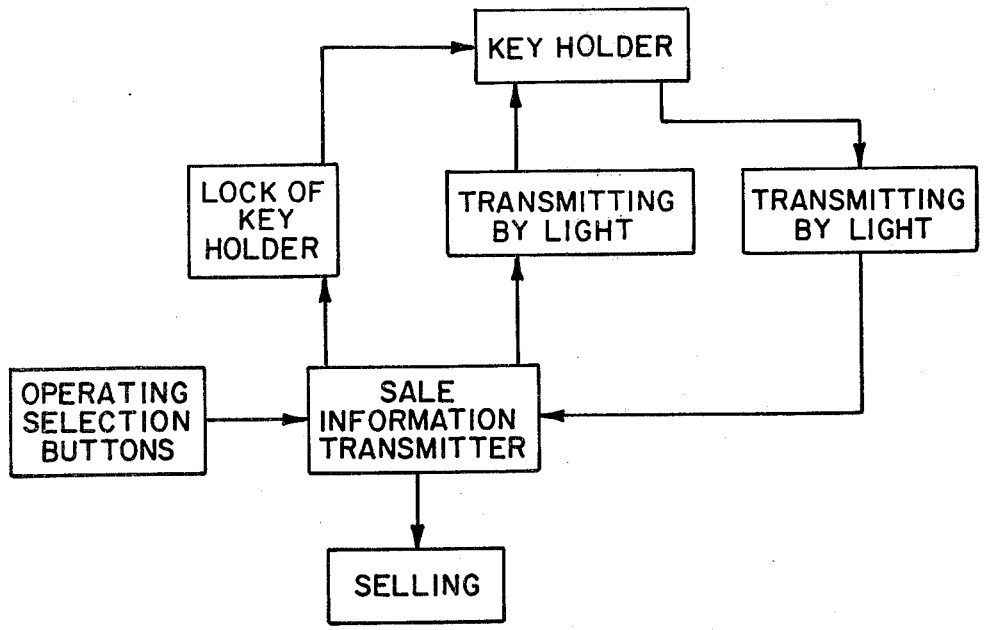
FIG. 16 is a block diagram showing the interaction between the memory holder and sales information transmitter of the invention.

The light emitting diodes 35 and 35 are flickered by the outputs of the sales data transmitter 30 and this flicker is detected in the phototransisters 3 and 4. When clock pulses are applied to the memory 12 comprising a shift register, the binary code of n bits is applied to the input terminal of the memory 12 in synchronizing with the clock pulses and the signals of the n bits are memorized in the memory 12 in serial. The flow of the signals at the sale time is shown in FIG. 16.

When the data transmission between the vending machine 27 and the memory holder 1 is being made, there is a fear that the customer pulls out the memory holder 1 and consequently the erratic data transmission occurs. To solve this problem, the present invention provides the solenoid 45 with the core 46 and the lever 47 as shown in FIG. 5. When the solenoid 45 is energized, the lever 47 is attracted and caused to rotate about its pivot pin to engage with the recess 55 of the memory holder 1 so that the pull out of the latter may be prevented. Instead of the solenoid 45, a permanent magnet may be used.

Instead of the reed switch 22 in the memory holder 1, any suitable switches may be employed. For instance, an opto-electric switch may be used in the memory holder 1 whereas a light-emitting element may be disposed in the vending machine instead of the solenoid 45. Furthermore, instead of the switch 22, a Hall-effect element may be used.

So far the memory 12 has been described as consisting of volatile elements such as CMOS device, but it may consist of a non-volatile memory with the reed switch 22 being connected to the positive terminal Vcc of the power source.

Figure 6:
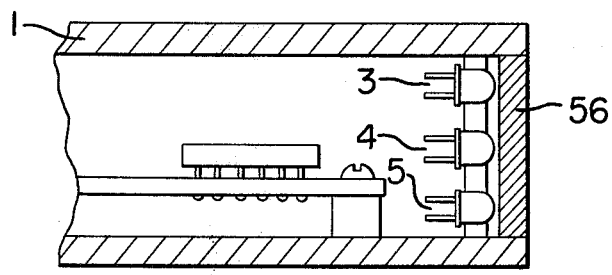
FIG. 6 is a fragmentary sectional view of a modification of the memory holder.

Next a modification of the memory holder 1 will be described with reference to FIG. 6. An infrared filter 56 is placed in front of the phototransistors 3 and 4 and the light emitting diode 5 to prevent damage thereto. Since the filter 56 consists of a red-colored, semi-transparent plate, a customer cannot see the inside of the memory holder 1 so that no curiousity arises, but the filter 56 has a transmission coefficient of about 90% for infrared radiation so that the optical data transmission may not be adversely affected by the provision of the filter 56. When the filter 56 is used, it is preferable to select phototransistors having the high sensitivity to the infrared radiation and a light emitting diode capable of the infrared radiation. In general, when one cannot see the inside of the memory holder 1, he shows no curiosity about its function so that the dames to the phototransistors 3 and 4 and the light emitting diode 5 may be prevented.

Instead of the filter plate 56 which is joined to the memory holder 1 by any suitable conventional method, a mixture of a plastic such as epoxy resin and a pigment capable of attaining the same transmission coefficient with that of the plate filter 56 may be molded into the memory holder 1. The plate or molded filter serves not only as a protective cover but also as an optical filter so that the damages to the photodiodes and the light emitting diode may be prevented and consequently a long service life of the memory holder 1 may be ensured.

The memory holder may be further modified to incroproate an ON-OFF switch and a light emitting element such as a flashlamp bulb or light emitting diode so that it may be used in case of an emergency or for searching the memory holder insertion opening 27 of the vending machine in the dark. Furthermore there is an advantage that the power source condition or the life of dry cells may be checked in terms of the brightness of the lamp or light emitting diode.

The memory holder 1 may be further modified to incorporate a conventional a room number displaying device consisting of liquid crystal display elements or light emitting diodes. A room number may be stored into the memory 12 of the memory holder 1 through the input terminals 12a and 12b from an accounting machine or the like, and may be applied through a display device driving device to the display device for display.

The reed switch 22 of the memory holder 1 is provided in order to ensure a longer service life of dry cells, and is energized to close when the holder is inserted into the accounting machine or the like. Therefore, when the memory holder 1 is inserted into the opening 28, the room number is displayed again, and it may be detected whether or not the memory holder is operating correctly.

When one of the selection buttons 23 through 26 is depressed, the sales code generator transmits the sales data into the memory holder and a selected merchandise is automatically discharged. In the memory 12 the sales data are shifted whenever a new sales data is received. Therefore that the room number is being displayed means that the memory holder has not been used yet for buying a merchandise after the previous sales data have been read out by the accounting machine or the like.

Second Embodiment, FIGS. 7 through 10

A vending machine 57 which is assumed to be installed in a guest room of a hotel in the second embodiment contains four kinds of merchandise A, B, C and D, each of which may be sold or discharged under the cooperation of sales solenoids 58, sold-out switches 59, sold-out relays 60 and selection relays 61. The letters A, B, C and D after the reference numerals of these parts denote that these parts are associated with the sales of the merchandise A, B, C and D, respectively. The front door 62 is formed with a merchandise selecting switch 63, a merchandise discharge opening 64 and an opening 66 into which is inserted a memory holder 65. An accounting machine 67 shown in FIG. 8 is assumed to be installed at a front desk for reading the sales data from the memory holder 65 for making a bill.

Figure 8:
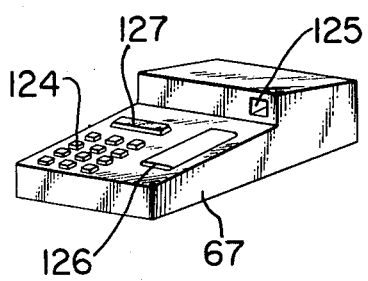
FIG. 8 is a schematic perspective view of an accounting machine used in the second embodiment.
Figure 15:
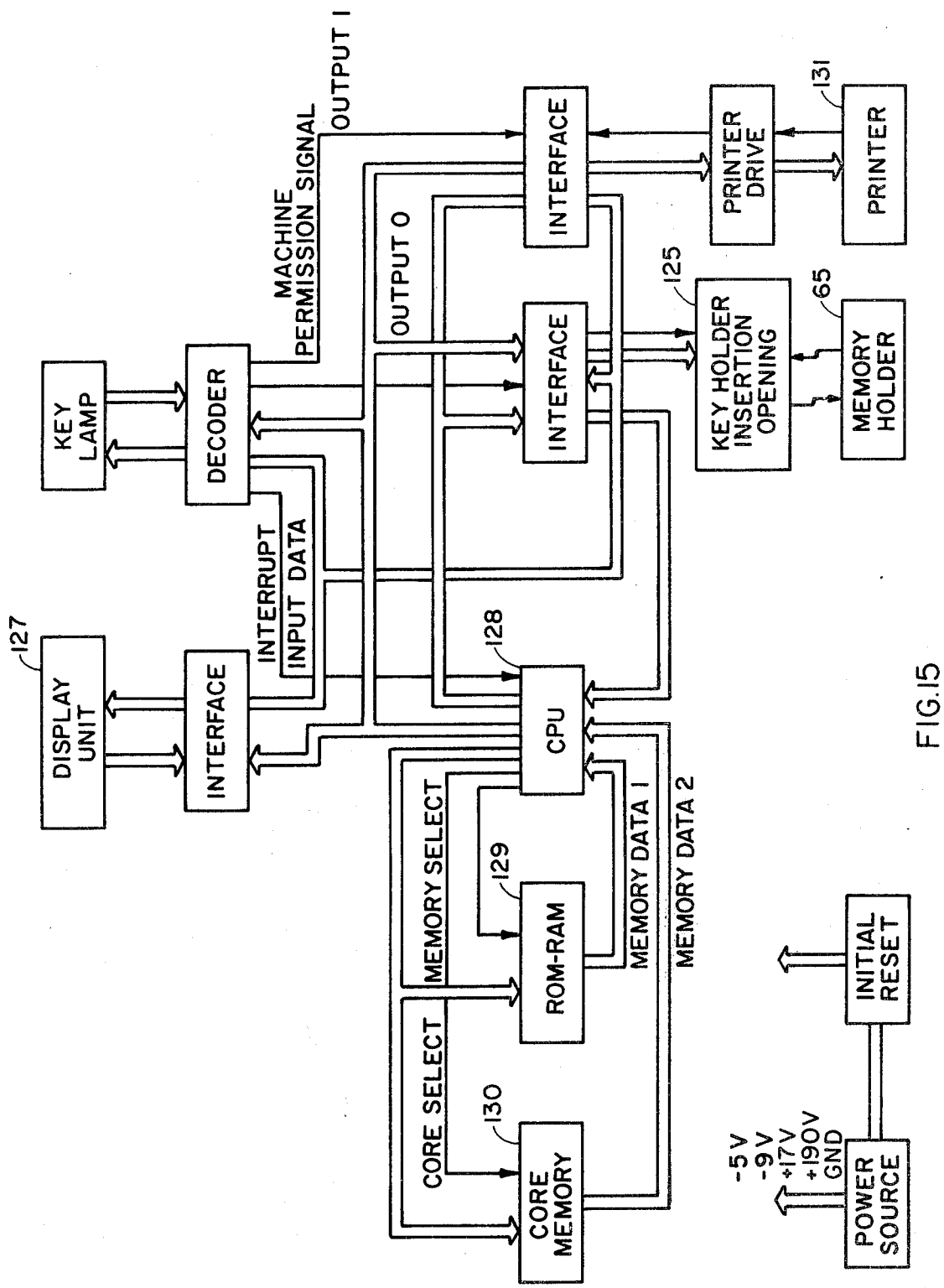
FIG. 15 is a block diagram of the accounting machine shown in FIG. 8.

The accounting machine 67, as shown in FIGS. 8 and 15, is arranged so that a 10 key operating section 124, an inserting inlet 125 of the memory holder 65, a print-out section 126 of print papers in sales data accounts and a display section 127 are seen from the outside of the accounting machine 67. The accounting machine 67 is operated in the 10 key operating section by hand as well as a cash register. The inserting inlet 125 of the memory holder 65 has the same formation as the inserting inlet 66 provided at the top of the vending machine 57 and the light transmitting elements such as a light emitting diode and a phototransistor are arranged in the inner part of the inserting inlet 125. Also, in the accounting machine 67 are provided a micro-processer 128, a ROM·RAM 129, a core memory 130 and a printer 131. The core memory 130 previously memorizes binary code signals corresponding to codes and prices of the sale merchandise. The ROM·RAM 129 reads out the sales information memorized in the memory 68, operates the micro-processer 128, memorizes the sales information at once and memorizes the program operating the micro-processor 128. The printer 131 and the display section 127 print out and display the sales information and the sum of the sales price according to the instruction of the micro-processor 128.

Figure 7:
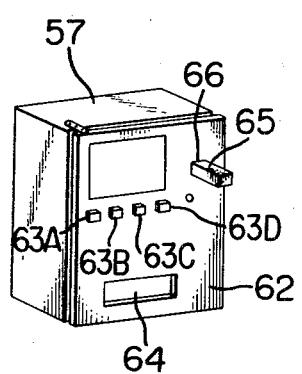
FIG. 7 is a schematic perspective view of a vending machine used in a second embodiment of the present invention.
Figure 9:
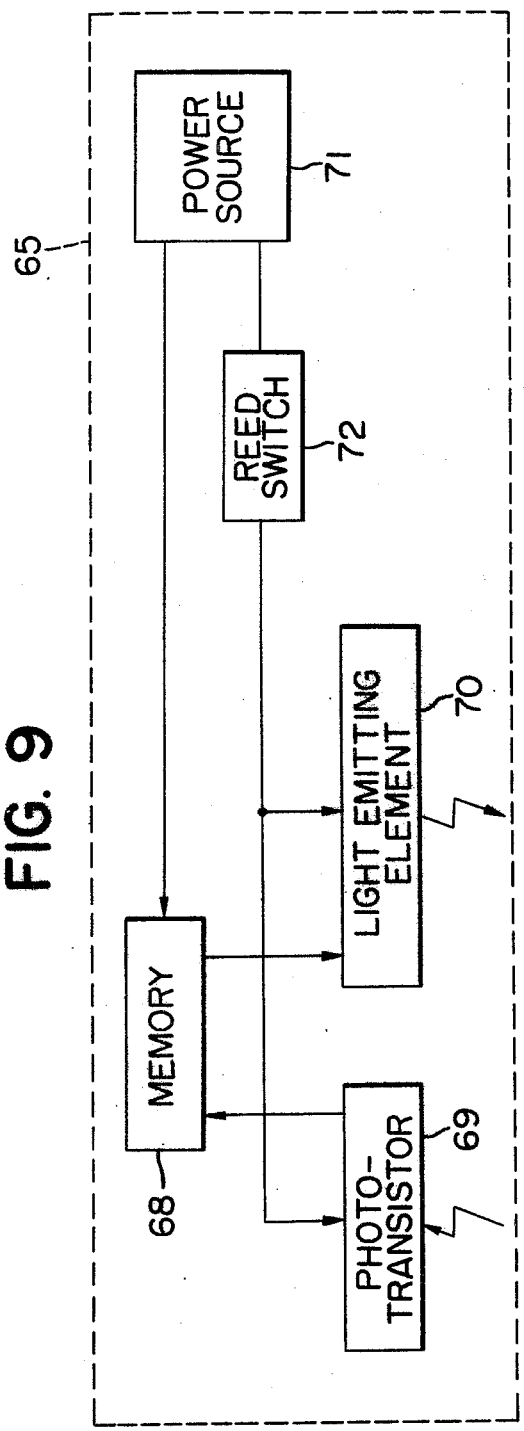
FIG. 9 is a block diagram of a circuit of a memory holder used in the second embodiment.

The memory holder 65 incorporates an electronic circuit which as shown in FIG. 9 comprises a memory 68 such as a shift register consisting of CMOS transistors, a photo cell such as a phototransistor 69 through which are stored sales data, a light emitting element 70 such as a light emitting diode through which the sales data stored in the memory 68 are read out, a power source 71 which always supplies the power to the memory 68 but selectively supplies the power to the photo cell 69 and the light emitting element 70 only when a reed switch 72 is closed when the memory holder 65 is inserted into the opening 66 of the vending machine 57 shown in FIG. 7.

Referring to FIG. 10, the vending machine 57 has a memory holder receiving section generally indicated by 73 and consisting of a memory holder sensor such as a microswitch or the like for detecting the insertion of the memory holder 65 into the opening 66, optical data transmission means 75 including a light emitting diode and a phototransistor disposed for the optical data transmission with the photo cell 69 and the light emitting element 70, respectively, and a solenoid 76 for closing the reed switch 72 in the memory holder 65.

The vending machine further includes a merchandise code generator generally indicated by the reference numeral 77 for generating the sales data for a selected merchandise and consisting of a pulse generator 78 for generating the pulses to be applied to the memory 68 in the memory holder 65 and a comparator 79 for comparing the sales data stored in the memory 68 in the memory holder 65 with the original sales data transmitted thereto from the code generator 77.

The vending machine 57 has a trouble indicating lamp 80 which is turned on when the sales data of a merchandise to be sold or discharged are not correctly stored in the memory holder 65 or the memory 68 thereof has stored the sales data to its full storage capacity, an overflow lamp 81, a memory-error lamp 82 and a vending relay 83 for initiating the sales condition. The overflow indication lamp 81 is turned on when the comparator 79 delivers the signal representative of the overflow of the memory 68 in the memory holder 65, and this signal is also transmitted through an OR gate 84 to turn on the trouble indication lamp 80. When the memory 68 may store the sales data, the sales-permission signal is transmitted to the vending relay 83 so that it may be further transmitted to the sales solenoid 58 through NAND and AND gates 85 and 86 associated with a selected merchandise. The sales-inhibit signal, if stored in the memory holder 65, is transmitted to NAND gate 85. The signal generated by the selection switch 63 when the latter is depressed is transmitted to the selection relay 61 whose output is applied not only to AND gate 86 but also to the sold-out relay 60. The signal from the sold-out switch 59 is transmitted to the sold-out relay 60 and the output from the relay 60 is transmitted to one input of an AND gate 87 whose the other input receives the signal from the holder sensor 74. The output from the AND gate 87 is transmitted through the pulse generator 78 and an OR gate 88 to the solenoid 76.

Next the mode of operation of the second embodiment will be described. The insertion of the memory holder 65 into the opening 66 of the vending machine is detected by the sensor 74 and the output signal therefrom is transmitted to the AND gates 87 and to the comparator 79. When a customer depresses the selection relay 61A for the merchandise A, the selection relay 61A is energized so that the output signal from the sold-out relay 60A is transmitted to one input of the AND gate 87A. When the output signal from the sensor 74 is also simultaneously applied to the other input of AND gate 87, the latter generates the output signal which is transmitted through OR gate 88 to the solenoid 76 to energize it. As a result, the reed switch 72 in the memory holder 65 is closed so that the sales data generated by the data generator 77 is transmitted through the transmission gate 75 and the phot cell 69 of the memory holder 85 and stored in the memory 68 and the stored data is transmitted back through the light emitting element 70 of the memory holder 65 and the transmission gate 75 to the comparator 79 in the data generator 77. The sales data transmitted back from the memory holder 65 is compared with the sales data transmitted from the generator 78 so that the comparator 79 may generate the sales-inhibit signal, sales-permission signal or sales-impossible or error signal.

The sales-impossible signal consists of the signal for turning on the memory error indication lamp 82 when the sales data stored in the memory 68 of the memory holder 65 is different from the original sales data transmitted from the vending machine and the signal for turning on the overflow lamp 81 and the trouble lamp 80 in case of the overflow of the memory 68.

The sales permission signal is transmitted to the vending relay 83 from which it is transmitted through NAND gate 85A to AND gate 86A to which is also applied the output from the selection relay 61A. In response to the output from AND gate 86a, the sales solenoid 58a is energized to initiate the discharge of the selected merchandise A. In response to the signal from the comparator 79 the pulse generator 78 generates the sales data which in turn is transmitted to the memory holder 65 to be stored in the memory 68. Simultaneously, the output signal is transmitted from the sales solenoid 58A to the selection relay 61A so that its output may be interrupted.

The sales-inhibit signal is generated to inhibit the sales of specific merchandises to specific persons. For instance, this signal inhibits the sales of cigarettes and alcohols to a minor, and is previously stored in the memory holder 65. For instance, assume that the merchandise A is prohibited to be sold to a minotor. The sales-inhibit signal is read out and transmitted to NAND gate 85A so that even when the selection switch 63A is depressed, the sales inhibit signal and the sales-permission signal are applied to NAND gate 85D so that its output signal is "0" and consequently the sales is inhibited.

Figure 17:
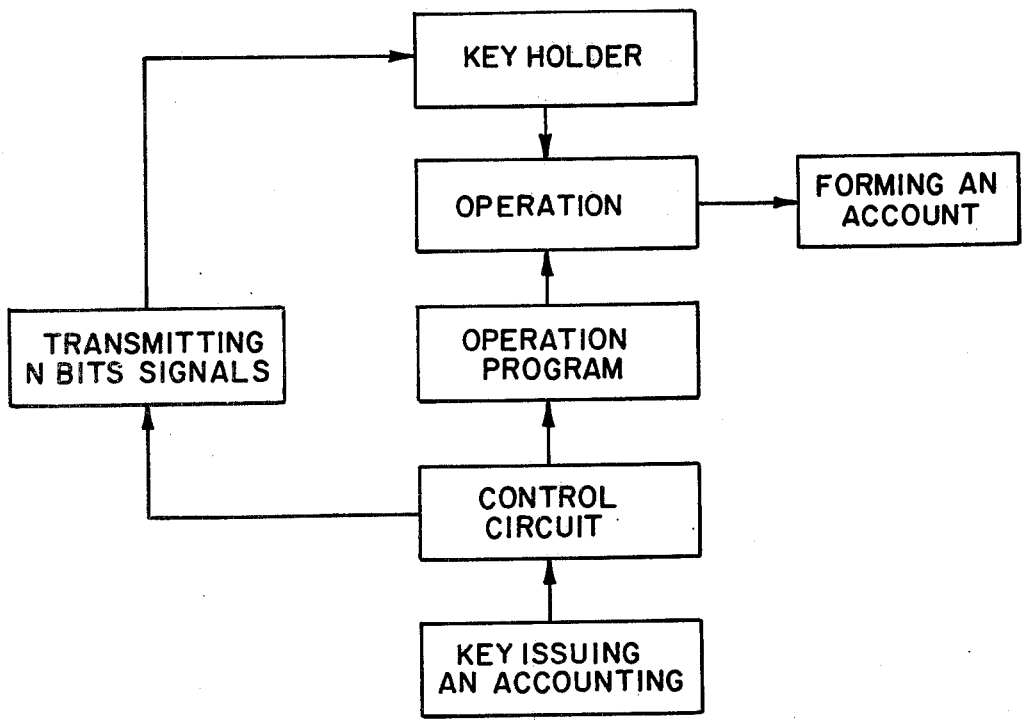
FIG. 17 is a block diagram showing the flow of signals which occurs in FIG. 16.
Figure 4:
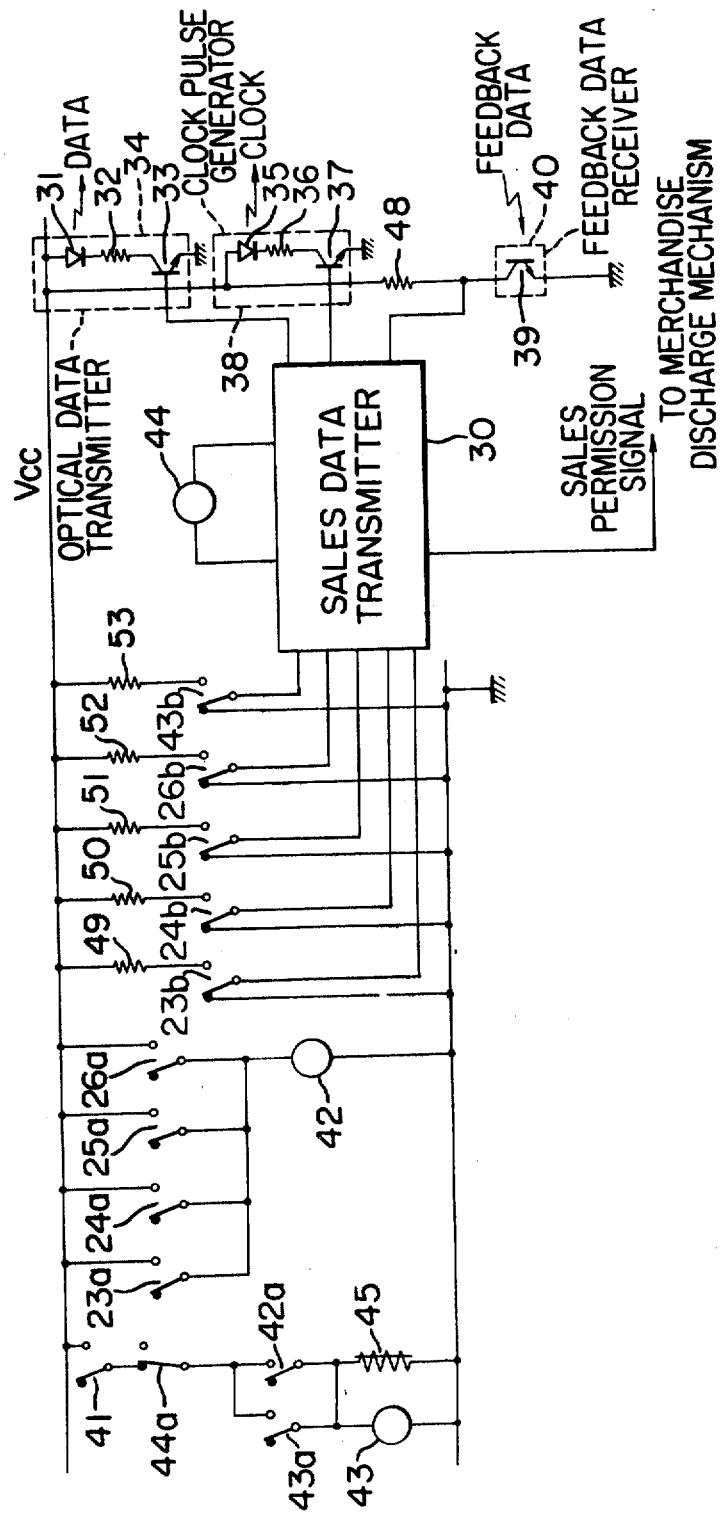

When the accounting of the price of sold merchandise is performed after the merchandise are sold by using the memory holder 65, the memory holder 65 is inserted into the inserting inlet 125 of the accounting machine 67 and the number and price of the sold merchandise are printed out in the paper. That is, inserting the memory holder 65 into the inserting inlet 125, the information of the binary code in the memory element 68 of the memory holder 65 are memorized in the RAM 129 by flickering the light emitting diodes and the phototransistors. The information memorized in the RAM 129 are supplied to the micro-processer 128 with the information of the core memory 130 by the operational program memorized in the RAM 129 and this information is operated in the micro-processer 128. The operated information is printed out of the printer 131 and simultaneously the sum of the price is displayed in the display section 127. The buyer pays a casher for the sum of the price displayed in the display section 127. The flow of the signals in FIG. 16 is shown in FIG. 17.

Figure 11:
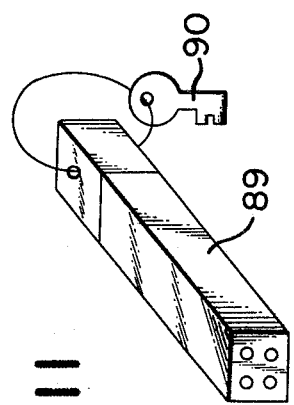
FIG. 11 is a perspective view of a memory holder used in a third embodiment of the present invention.

Third Embodiment, FIGS. 11 through 13

When a memory holder 89 with a key 90 is inserted into a memory holder opening of a vending machine incorporating an electronic circuit shown in FIG. 12 (the circuit may be placed in a suitable box or casing which in turn is mounted on the vending machine or placed adjacent thereto.), the signal CS representative of the insertion of the memory holder 89 and the signal IT representative of a merchandise selected are applied to a sales data generator 91. In practice, a plurality of merchandise selection signals are generated and applied to the data generator 91 in practice as with the case of the first and second embodiments described above, but for the sake of simplicity only one signal IT is shown in FIG. 12. In response to those signals CS and IT, the data generator 91 generates a data signal DT, clock pulses CK in synchronism with which the data signal is stored and a switching signal SL to be described in detail hereinafter.

The sales data signal is transmitted to a comparator 92 for comparison with a data signal FD fed back from the memory holder 89 and the output from the comparator 92 is applied to one input terminal of an AND gate 93 whose the other input terminal is applied with an output signal from the data generator 91. The output from AND gate 93 is applied to a merchandise discharge control circuit 94 to generate a merchandise discharge signal EN.

In FIG. 13 there is shown a diagram of an electronic circuit of the memory holder 89. It comprises shift registers 95 and 96 consisting of CMCS transistors. The data signal DT is shifted one bit in the shift register 95 and 96 in response to each of the clock pulses CK, and the shift register 95 is a buffer memory while the shift register 96 is a main memory. A switching circuit 97 enables the clock pulses CK to be applied to the shift register 96, and an AND-OR 98 enables the shift register 95 or 96 to transmit its contents to the vending machine as a feedback data signal FD. When the contents in the shift registers 95 and 96 are read-out by the accounting machine, the feedback signals FD become read-out signals.

Next the mode of operation of the third embodiment with the above construction will be described. When a customer inserts the memory holder 89 into the opening of the vending machine and depresses one of merchandise selection switches, the data generator 91 delivers the data signal DT and clock pulses CK serially and the switching signal SL which inhibits the application of the clock pulses CK to the shift register 96. The shift register 95 is capable of storing one word consisting of n bits. When one word of the data signal has been stored in the shift register 95, n bits of clock pulses CK are transmitted again. The comparator 92 receives the fedback data signal FD and compares it with the transmitted data signal DT. When the two signals coincide with each other, the switching signal is generated which enables n bits of the clock pulses CK to be applied to both the shift registers 95 and 96 so that the contents in the shift register 95 may be transferred into the shift register 96. Meanwhile the control circuit 94 generates the signal EN to permit the discharge of a merchandise that the customer has selected. When the fedback signal FD does not coincide with the data signal DT, the switching signal SL remains in the initial state so that no clock pulse CK is applied to the shift register 96 but n bits of the clock pulses CK are applied to the shift register 95. As a result, the contents in the register 95 are erased. AND gate 93 remains closed so that the control circuit 94 does not generate the discharge signal EN.

For the data transmission between the memory holder and the vending machine, optical, electrical, magnetic or high frequency means may be employed, and the objects of the present invention may be accomplished with any of the above means.

What is claimed is:

1. An article vending and accounting system, comprising
   (a) a plurality of vending machines each containing different kinds of merchandise which may be freely selected by a customer,
   (b) a merchandise code generator disposed within each vending machine for generating a merchandise code of a merchandise item selected by the customer,
   (c) first connection means disposed within each vending machine,
   (d) a plurality of memory holders each of which may be carried by a customer for permitting the selection of merchandise when connected to said first connection means,
   (e) memory means such as a shift register disposed within each of said memory holders for storing therein the merchandise code transmitted from said merchandise code generator,
   (f) means for transmitting the merchandise data generated by the code generator,
   (g) switching means disposed within each memory holder for enabling the storage in and read out from said memory means of merchandise data transmitted from said merchandise code generator when said switching means is activated,
   (h) an accounting machine for reading the merchandise codes stored in said memory means in the memory holder when connected thereto for preparing a bill, and
   (i) actuating means disposed adjacent to said first connection means of the vending machine and a second connection means of said accounting machine for activating said switching means when the memory holder is connected to said first or second connection means.

2. An article vending and accounting system as set forth in claim 1 wherein the interconnection between the memory holder and the vending machine or accounting machine is established by the insertion of the memory holder into a predetermined place of the vending or accounting machine; said switching means of said memory holder is a read switch; and said actuating means is an electromagnet energizable by the operation of the vending machine.

3. An article vending and accounting system as set forth in claim 1 further comprising
   a comparator dispensed in the vending machine for comparing a merchandise code generated by and transmitted from said merchandise code generator with a merchandise code stored in said memory means of the memory holder and generating a memory-error signal when said two codes do not coincide with each other.

4. An article vending and accounting system as set forth in claim 1 further comprising
   a comparator for generating an overflow signal when the over-flow of said memory means of the memory holder occurs.

5. An article vending and accounting system as set forth in claim 1 wherein said memory means in the memory holder comprises
   (a) a buffer memory for storing a merchandise code generated by and transmitted from said merchandise code generator and feeding back said stored merchandise code to the vending machine to detect whether or not the merchandise code fedback to the vending machine coincides with the merchandise code generated by said merchandise code generator, and
   (b) a logic circuit for transmitting the sales signal to said comparator only when said two codes coincide with each other, confirming the output of said sales signal and anabling said buffer memory to transfer its contents into a main memory.

6. An article vending and accounting system as set forth in claim 1 wherein in the vending machine a comparator is provided which compares a merchandise code transmitted from said merchandise code generator with an inhibition instruction code previously stored in said memory means of the memory holder so what when said two codes coincide with each other the vending machine may be prohibited to sale a merchandise designated by said inhibition instruction code.

7. An article vending and accounting system as set forth in claim 6 wherein said comparator compares a merchandise code generated by and transmitted from said merchandise code generator with a merchandise code stored in said memory means of the memory holder and generating a sales signal when said two codes coincide with each other.

8. An article vending and accounting system as set forth in claim 6 wherein said comparator generates an overflow signal when the overflow of said memory means of the memory holder occurs.

9. An article vending and accounting system as set forth in claim 6 wherein said comparator compares a merchandise code generated by and transmitted from said merchandise code generator with a merchandise code stored in said memory means of the memory holder and generating a sales signal when said two codes coincide with each other but generating a sales-impossible signal when said two codes do not coincide with each other and generating an overflow signal when the overflow of said memory means of the memory holder occurs.

10. An article vending and accounting system as set forth in claim 6 wherein said comparator compares a merchandise code generated by and transmitted from said merchandise code generator with a merchandise code stored in said memory means of the memory holder and generating a memory-error signal and a sales-impossible signal when said two codes do not coincide with each other.

11. An article vending and accounting system as set forth in claim 10 further wherein
the vending machine has memory-error indicating means actuable in response to the memory-error signal from said comparator, and sales-impossible indication means actuable in response to the sales-impossible signal from said comparator.

12. An article vending and accounting system, comprising:
a plurality of vending machines each containing different kinds of merchandise which may be freely selected by a customer,
a generator within each of said vending machine for generating a merchandise code of binary code signals corresponding to selected merchandise,
a memory means commonly carried by the customer, including a memory element which comprises a shift register for memorizing merchandise code signals optically transmitted from said generator,
an accounting machine for reading out the memorized data in said memory element when connected to said memory means, for changing said read out data to a sale price and for being paid said sale price by the customer,
a reed switch disposed within said memory means for enabling the transmission of data to said memory element,
a switch for detecting the insertion of said memory means in said vending machine or said accounting machine and for controlling the operation of said generator in response thereto, and
an actuating means comprising an electromagnet for operating said reed switch.

13. An article vending and accounting system as set forth in claim 12 wherein in the vending machine a comparator is provided for comparing a merchandise code generated by and transmitted from said merchandise code generator with a merchandise code stored in said memory means in the memory holder and generating a sale signal when said two codes are coincident with each other.

14. An article vending and accounting system as set forth in claim 13 wherein said actuating means includes a lever for selectively preventing said memory means from being inserted into an opening of said vending machine and from slipping out of said opening during the sale operation.

* * * * *

UNITED STATES PATENT OFFICE
CERTIFICATE OF CORRECTION

Patent No. 4,179,064        Dated December 18, 1979

Inventor(s) Toshihiro Yoshioka, et al

It is certified that error appears in the above-identified patent and that said Letters Patent are hereby corrected as shown below:

In the Title Page, lines 4-5 of "Inventors" information:
    Delete "Matsushita Reiki Corp., Ltd., 03, both of Osaka, Japan".

In the Title Page, the "Assignee" information should read:
    --Matsushita Electric Industrial Co., Ltd. and Matsushita Reiki Co., Ltd.--

In the Title Page, under "Foreign Application Priority Data" insert the following: -- March 25, 1976  Japan  51-33369 --.

Column 2, line 6: "temporatily" should be --temporarily--.

Column 3, line 44: "1417" should be --14517--.

Column 5, lines 42-43: "conumption" should be --consumption--.

Column 6, line 35: "phototransisters" should be --phototransistors--.

Column 7, lines 25-26: "incroproate" should be --incorporate--.

Column 10, line 34: "casher" should be --cashier--.

UNITED STATES PATENT OFFICE  Page 2 of 2
CERTIFICATE OF CORRECTION

Patent No. 4,179,064   Dated December 18, 1979

Inventor(s) Toshihiro Yoshioka, et al

It is certified that error appears in the above-identified patent and that said Letters Patent are hereby corrected as shown below:

Column 12, line 51: "anabling" should be --enabling--.

In the Drawings, please correct Fig. 4 per the attached

Signed and Sealed this

Seventh Day of October 1980

[SEAL]

Attest:

SIDNEY A. DIAMOND

Attesting Officer   Commissioner of Patents and Trademar